United States Patent Office 3,435,895
Patented Apr. 1, 1969

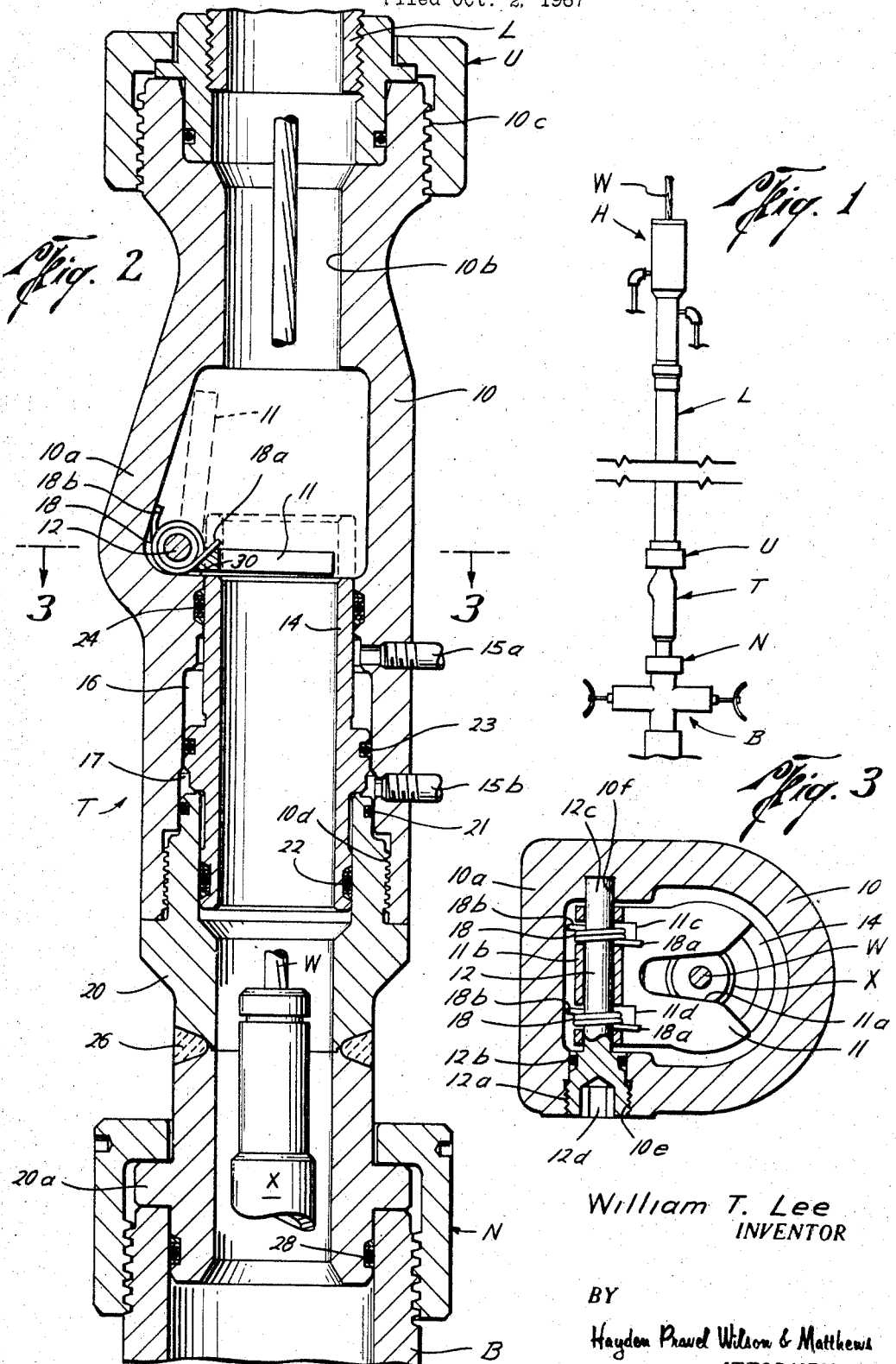

3,435,895
AUTOMATIC WIRELINE TOOL TRAP ASSEMBLY
William T. Lee, Magnolia, Tex., assignor to Bowen Tools, Inc., a corporation of Texas
Filed Oct. 2, 1967, Ser. No. 672,333
Int. Cl. E21b 33/02, 33/05
U.S. Cl. 166—75          8 Claims

ABSTRACT OF THE DISCLOSURE

An automatic wireline tool trap assembly having a hinged or pivoted gate contained within a central opening of a tubular housing wherein the gate is spring biased to extend at substantially right angles to the axis of the tubular housing to partially close off its central opening to prevent well tools from dropping therebelow while permitting movement of a wireline therethrough under normal operations. A hydraulically actuated mechanism is adapted to move the gate to an open position against the action of the spring mechanism so that a tool may be lowered on the wireline below the gate for well operations. The tool trap thus serves to catch or trap a well tool which may become separated from its wireline during removal thereof at the lubricator or other wellhead apparatus, whereby loss of the well tool down the well is avoided.

BACKGROUND OF THE INVENTION

Field of the invention

The field of the present invention is tool traps for well tools, particularly wireline tools used in well operations. In the typical wireline operation, a metal cable or wireline is used to suspend and control various tools where the tools are to be employed below the surface of the earth within the interior of the well. Because of the high subsurface pressures encountered in such operations, a sealing means, such as a line wiper or control head, is employed above a lubricator. In pulling the well tool upwardly into the lubricator, the tool is occasionally brought up too quickly and is severed or separated from the wireline. The apparatus of the present invention is disposed below the lubricator to catch the separated tool and thereby prevent its loss downhole.

Description of the prior art

The prior art includes a manually operable wireline tool trap marketed by Bowen Tools, Inc., of Houston, Texas (page 839 of Bowen 1966–1967 Catalog). Such tool trap employs a hinged gate which is pivotally connected to a lever-like handle which carries a weight outside of the tool trap body or housing. As the wireline is pulled upwardly, the tool lifts the gate, allowing the tool to pass upwardly above the gate. When the tool has cleared the gate of the tool trap, the gate rotates downwardly to its closed position where it blocks the later dropping of the tool. The tool may be lowered back into the well by manually rotating the weighted handle to open the gate. Because such prior tool trap has a moving hinge pin extending through the trap body from the gate to the handle, it is not leakproof, particularly at higher well pressures. Also, at the higher well pressures, friction at a seal between the hinge pin and the body becomes so great that the hinge pin cannot be moved, and therefore the gate cannot be moved by the handle. Moreover, the gate of the prior device must be manually displaced to permit the tool to be lowered into the well.

SUMMARY OF THE INVENTION

The automatic tool trap assembly of the present invention provides a leakproof, hydraulically activated means for automatically preventing the loss of wireline tools when the wireline is severed and the tool is in a position above the tool trap. The one-way spring loaded gate of the tool trap of the present invention is wholly contained within the interior of the tubular housing of the tool trap to thus prevent any possibility of leakage through the housing walls. A hydraulically or fluid activated sleeve moves internally of the tubular tool trap to open the gate when it is desired to lower the tool into the well, thus obviating the need for any manual operation of the tool trap.

BRIEF DESCRIPTION OF THE DRAWINGS

FIG. 1 of the drawings illustrates a typical wireline wellhead installation which includes the automatic tool trap of the present invention;

FIG. 2 of the drawings illustrates an enlarged sectional view of the automatic wireline tool trap of the invention; and FIG. 3 of the drawings illustrates a cross-sectional view of the automatic wireline tool trap of the present invention taken along the line 3—3 of FIG. 2.

DESCRIPTION OF THE PREFERRED EMBODIMENT

In FIG. 1 of the drawings, the letter T designates generally the automatic wireline tool trap assembly of the present invention in position between a conventional blowout preventer B and a conventional lubricator L. A line wiper, grease injector, or control head at H is secured to the top of the lubricator L and for present purposes may be considered as acting essentially as a wiper seal for the moving wireline W which extends through the entire assembly.

The tool trap T of the present invention may be best understood by reference to FIGS. 2 and 3 of the drawings where it may be seen that the tool trap T includes a generally tubular housing or body 10. The tubular body 10 houses a movable gate 11 which is hinged about a fixed pin 12. The pin 12 is contained within an enlargement 10a in the wall of the tubular housing 10 so that it is completely removed from the longitudinal or central opening 10b of the body 10.

A movable sleeve 14 is confined within the hollow interior of the housing 10 at a position below the hinge pin 12. Two hydraulic supply tubes 15a and 15b supply hydraulic or other fluid through the walls of the housing 10 and into the annuli 16 and 17, respectively. As will hereinafter be described in greater detail, when the hydraulic fluid in the annulus 17 is pressurized, the sleeve 14 acts as a gate opening means when it is forced upwardly along the interior of the tubular member 10 to the position indicated by the dotted line (FIG. 2), causing the gate 11 to move upwardly into the recess of the enlarged portion 10a as also indicated by the dotted lines (FIG. 2). Similarly, when the hydraulic fluid in the annulus 16 is pressurized, the sleeve 14 and the gate 11 resume their original positions shown in solid lines (FIG. 2).

With reference to FIG. 3 of the drawing, it may be seen that the gate 11 is centrally apertured by a slot 11a to permit the wireline W to be moved longitudinally through the interior of the tubular member 10 without engaging the gate 11. The slot 11a is, however, too small to permit an instrument such as the tool X connected to the lower end of the wireline W from passing through the gate 11. Consequently, as will be explained hereinafter, when the wireline is drawn upwardly, the tool X engages the bottom of the gate 11 and pivots it about the hinge pin 12 into the dotted position indicated in FIG. 2 of the drawing. As seen in FIGS. 2 and 3, the gate 11 is biased, or spring loaded, by the action of springs wholly confined within the housing 10, such as two springs 18 which urge the gate to the down or closed position in the absence of any upward force exerted against it. When the tool X completely clears the gate 11, the springs 18a and 18b snap the gate into its closed position which is substantially perpendicular to the axis of the opening 10b.

Considering the present invention in more detail, it may be observed that the tubular member 10 has threads 10c at its upper end which are used to attach it to a conventional union assembly indicated generally at U. The lower end of the housing member 10 is internally threaded at 10d to receive a composite adapter member 20 which serves the dual function of adapting the tool trap T to a conventional union fitting and of permitting an access means for the removal of the sleeve 14 and the gate 11 from the member 10. With respect to the latter removal function, the sleeve 14 may be removed by first unthreading the adapter 20 from the member 10 and then sliding the sleeve 14 out of the housing member 10. As will hereinafter be described in greater detail, the gate 11 may also be removed from the member 10 after the sleeve 14 has first been removed.

The upper end of the adapter 20 carries a resilient O-ring 21 in its outer cylindrical surface to form a leakproof seal with the housing member 10. An O-ring assembly 22 and an O-ring 23, both of which are preferably carried by the sleeve 14, co-operate with the O-ring 21 to seal off the annulus 17. As the hydraulic pressure supplied by the line 15b increases, the sleeve 14 is forced upwardly.

Similarly, an O-ring assembly 24 carried by the member 10 cooperates with the O-ring 23 to seal off the annulus 16. An increase in the pressure of the hydraulic fluid supplied by the line 15a forces the sleeve 14 downwardly.

From the foregoing, it is apparent that the gate 11 is raised by increasing the pressure of the hydraulic fluid supplied by the line 15a and it is permitted to resume its rest position against a shoulder 30 within the housing 10 by reducing the pressure in the annulus 17 and increasing the pressure of the fluid supplied by the line 15a.

The adapter 20 is usually constructed of two mating actions which are securely joined to each other by a weld 26. It will of course be appreciated that the adapter 20 may be constructed in any desired number of sections or in only a single section. The lower portion of the adapter 20 carries a flange 20a over which is positioned a conventional union nut N which connects the tool trap T to the blowout preventer B or other equipment therebelow. An O-ring assembly 28 disposed in the outer cylindrical surface at the lower end of the adapter 20 provides a leakproof seal with the blowout preventer B.

Referring now to FIG. 3 of the drawing, the hinge pin 12 is equipped with threads 12a which engage threads 10e formed in the member 10. A multisided socket 12d is formed in the head of the pin 12 to receive an Allen wrench which may be used to tighten the pin 12 in the threads 10a. A resilient O-ring or other seal 12b is carried in a reduced diameter portion of the head of the pin 12 to assist in providing a leakproof engagement with the housing 10. A cylindrical recess 10f formed in the inner wall of the member 10 receives the shank end 12c of the pin 12 to provide a secure mounting for the pin 12.

The shank of the pin 12 extends through a tubular eye 11b formed at one end of the gate 11. The eye 11b is slotted at 11c and 11d to accommodate the coiled springs 18a and 18b which encircle the pin 12. Each spring 18 is coiled under compression with one end 18a in engagement with the upper surface of the gate 11 and with the other end 18b in engagement with the wall of the housing 10.

As indicated hereinbefore, the gate 11 may be removed from the member 10 by first removing the sleeve 14 and then removing the pin 12 to release the gate 11 and the springs 18. With the pin 12 removed, the gate 11 may be extracted through the bottom of the member 10. It is apparent from the foregoing that the gate 11, springs 18, pin 12, and the sleeve 14 may all easily be removed and replaced or repaired as desired.

As best illustrated in FIG. 3 of the drawing, the enlargement 10a in the member 10 is constructed to provide ample room for receiving the gate 11 when the gate is in its raised or open position. FIG. 2 illustrates the ability of the trap T to provide for complete removal of all components of the gate mechanism from the central passage of the housing 10 to insure free passage of the tool X during its upward movement.

In a typical wireline operation using the tool trap T of the present invention, the gate 11 is first pivoted up into the enlargement 10a by pressurizing the annulus 17. While the gate 11 is in the open position, the tool X is lowered through the central opening 10b of the housing 10. When the top of the tool X has passed below the gate 11, the annulus 17 is depressurized and the annulus 16 is pressurized to allow the springs 18 to urge the gate 11 to its down or closed position. The gate remains in this position until the wireline work has been completed, and it is desired to retract the tool X. As the wireline is pulled back out of the tubing when retracting the tool X, the top of the tool X engages the lower face of the gate 11 and continued raising of the tool forcibly swings the gate 11 against the action of the springs 18 into the enlargement 10a. When the bottom of the tool clears the gate 11, the springs 18 urge the gate 11 into the down or closed position.

From the foregoing explanation, it will be apparent that should the operator misjudge and break the tool away from the wireline, the tool will fall back into the tubing until it strikes the gate 11 where its fall will be arrested. The wellhead assembly may then be disassembled to recover and reattach the tool X and the wireline W.

The foregoing disclosure and description of the invention are illustrative and explanatory thereof, and various changes in the size, shape, and materials as well as in the details of the illustrated construction may be made within the scope of the appended claims without departing from the spirit of the invention.

I claim:
1. A tool trap assembly comprising:
 (a) a tubular housing having a longitudinal opening extending therethrough;
 (b) a gate disposed in said longitudinal opening of said tubular housing;
 (c) means mounting said gate for movement from a first position across said opening to a second position at one side of said opening;
 (d) said gate having an opening for movement of a wireline therethrough and with surfaces adjacent said opening for engagement by a well tool to thereby catch the well tool above said gate when said gate is in said first position;
 (e) opening means disposed within said tubular housing for moving said gate from said first position to said second position to thereby open said gate; and
 (f) closing means within said tubular housing for moving said gate from said second position to said first position for thereby closing said gate.

2. The structure of claim 1, wherein said closing means includes a spring means for biasing said gate into said first position.

3. The structure of claim 1, wherein said opening means comprises:
 (a) a sleeve within said longitudinal opening of said tubular housing;
 (b) means mounting said sleeve for reciprocal movement in said housing; and
 (c) fluid pressure means for actuating said sleeve to move same.

4. The structure of claim 1, including a union pin connected to one end of said tubular housing and a union nut connected at the other end of said tubular housing for connecting the tool trap assembly into a conventional union coupling.

5. The structure of claim 1 wherein:
(a) said closing means includes a spring means for urging said gate into said first position;
(b) a union fitting on one end of said housing for securing said tool trap assembly to a mating union fitting in a wellhead assembly; and
(c) a removable adapter means on the other end of said housing for securing said tool trap assembly to a union fitting in a wellhead assembly.

6. The structure of claim 1, wherein said mounting means includes:
(a) a hinge pin mounted in said housing;
(b) said hinge pin having threads thereon for threaded connection with said housing; and
(c) seal means with said pin for preventing leakage of fluid from said housing around said pin.

7. The structure of claim 1, wherein said opening means comprises:
(a) a sleeve within said longitudinal opening of said tubular housing;
(b) means mounting said sleeve for reciprocal movement in said housing;
(c) fluid pressure means for actuating said sleeve to move same;
(d) said fluid pressure means having fluid pressure supply lines communicating through the wall of said housing to supply pressurized fluid to said sleeve to thereby cause said sleeve to reciprocate in said longitudinal opening of said tubular housing; and
(e) said sleeve having a piston ring thereon which is subjected to the fluid pressure from said supply line so that said sleeve is moved in response to a differentioal pressure acting on said piston.

8. The structure set forth in claim 1, wherein:
(a) said housing has an enlargement to provide a pocket adjacent said longitudinal opening for receiving said gate in said second position, whereby said gate is disposed to one side of said longitudinal opening for the unobstructed passage of well tools through said housing;
(b) said opening means includes a longitudinally movable sleeve disposed in said longitudinal opening of said housing below said gate for moving upwardly to force said gate to said second position; and
(c) said sleeve having a longitudinal bore of substantially the same diameter as the longitudinal opening of said housing for the passage of well tools therethrough when said gate is in said second position.

References Cited

UNITED STATES PATENTS

| | | | |
|---|---|---|---|
| 1,591,514 | 7/1926 | Dezam | 166—83 |
| 1,659,244 | 2/1928 | Cormier | 166—83 |
| 2,207,033 | 7/1940 | Toney. | |
| 2,350,863 | 6/1944 | Bailey | 166—70 |
| 2,710,064 | 6/1955 | Osmun | 166—70 |
| 3,071,188 | 1/1963 | Raulins | 166—75 X |

DAVID H. BROWN, Primary Examiner.

U.S. Cl. X.R.

166—70